US006153992A

United States Patent [19]

Gersemsky et al.

[11] Patent Number: 6,153,992

[45] Date of Patent: Nov. 28, 2000

[54] RUNNING GEAR, IN PARTICULAR FOR HOISTS AND SUSPENDED LOADS, AND METHOD OF BRAKING A RUNNING GEAR

[75] Inventors: Udo Gersemsky, Herdecke; Axel Hauschild, Unna; Rolf Koschorrek, Wetter; Torsten Sattler, Witten, all of Germany

[73] Assignee: Mannesmann AG, Düsseldorf, Germany

[21] Appl. No.: 09/281,487

[22] Filed: Mar. 30, 1999

[30] Foreign Application Priority Data

Apr. 7, 1998 [DE] Germany ........................... 198 16 573

[51] Int. Cl.[7] ..................................................... H02K 17/32

[52] U.S. Cl. ............................................................. 318/362

[58] Field of Search ..................................... 318/362, 258; 187/316

[56] References Cited

U.S. PATENT DOCUMENTS

| | | | |
|---|---|---|---|
| 4,342,378 | 8/1982 | Hmelovsky | 187/29 R |
| 4,378,059 | 3/1983 | Hatakeyama et al. | 187/29 R |
| 5,155,305 | 10/1992 | Horbruegger et al. | 187/119 |
| 5,625,175 | 4/1997 | Gutkenecht et al. | 187/316 |

FOREIGN PATENT DOCUMENTS

| | | |
|---|---|---|
| 42 08 717 C2 | 10/1992 | Germany . |
| 42 23 561 A1 | 1/1994 | Germany . |
| 196 17 104 A1 | 10/1997 | Germany . |
| 196 20 150 A1 | 10/1997 | Germany . |

*Primary Examiner*—Robert E. Nappi
*Assistant Examiner*—Rita Leykin
*Attorney, Agent, or Firm*—Henry M. Feiereisen

[57] ABSTRACT

A running gear for hoists and suspended loads has a running rail with two spaced-apart travel tracks that support axially spaced-apart running wheels. An electric motor is coupled to a self-locking worm gear for directly driving one of the running wheels. The running wheels are rotatably supported in a frame to which an assembly for hoisting suspended loads is secured. In order to prevent the running gear from rolling and pitching during braking, which can cause increased wear of the running gear and the running rail, a control unit is provided which is operatively connected to the electric motor and determines a start-up rate during the start-up phase of the motor from an average increase of the motor torque as a function of time, and decreases the motor torque as a function of time at a slower rate than the start-up rate for slowing down the running gear.

10 Claims, 2 Drawing Sheets

RUNNING GEAR, IN PARTICULAR FOR HOISTS AND SUSPENDED LOADS, AND METHOD OF BRAKING A RUNNING GEAR

CROSS-REFERENCES TO RELATED APPLICATIONS

This application claims the priority of German Patent Application Serial No. 198 16 573.0, filed Apr. 7, 1998, the subject matter of which is incorporated herein by reference.

BACKGROUND OF THE INVENTION

The present invention relates, in general, to a running gear for hoists and suspended loads, and more particularly to a method for braking a running gear without employing an external brake.

German Pat. No. DE 196 20 150 A1 describes a running gear which includes a running rail formed of flange parts and web members. A pair of running wheels which are located opposite one another are supported by the inner surfaces of the lower flange, and guide rollers for guiding the running gear are arranged in front and behind the running wheels and bearing upon both sides of the lateral surfaces of the lower web. The running wheels and the guide rollers are rotatably supported on crossbars which are connected to each other below the rail. The running gear is propelled by driving one of the running wheels with a motor through a worm gear. In addition, the guide rollers of the running gear move in guides which are arranged on the web of the running rail in the longitudinal direction of the running rail.

A running gear of this type can be subject to pitch and roll, in particular when a braking action is applied. This can result in increased wear of the running gear and of the running rail.

SUMMARY OF THE INVENTION

It is thus an object of the present invention to provide an improved method for braking a running gear, obviating the afore-stated drawbacks.

It is yet another object of the present invention to provide an improved running gear that can brake smoothly without pitching and rolling.

In general, according to one aspect of the invention, a method is disclosed for braking a running gear which includes a running rail with two spaced-apart travel paths for support of running wheels that are spaced apart in an axial direction, with one of the running wheels driven by an electric motor through a self-locking worm gear. A self-locking worm gear operates similar to a continuously applied external brake by introducing a torque that counteracts a motor torque applied during an acceleration phase. Advantageously, the self-locking effect depends on the rotation speed of the self-locking worm gear, wherein the braking effect is greatest when the rotation speed of the gear is zero and decreases with increasing rotation speed of the gear.

In accordance with the method of the invention, during a start-up phase of the running gear, a start-up time constant is determined from an average increase of a motor torque, and braking of the running gear is realized by so decreasing the motor torque that the momentary change in the motor torque per unit time, i.e. the rate of the change in the motor torque versus time, is always smaller than the start-up rate. The effective self-locking action and the braking effect associated therewith increase steadily to thereby prevent the wheels from blocking. By adjusting the motor torque to decelerate the running gear in this manner, the resulting effect is similar to that of a drive having a flywheel and a mechanical brake. The cooperative effect of reducing the motor torque and employing the self-locking worm is consequently the same as that of engaging the brake in a flywheel drive, enabling smooth braking without rolling or pitching; However, a method according to the present invention has the advantage of eliminating the need to adjust and maintain a separate brake. Moreover, the need for providing a flywheel, which is expensive and takes up much space, is also eliminated.

A method according to the present invention may be implemented in a simple manner when determining the start-up time constant by dividing an average change of the motor drive current as a function of time over a predetermined time interval by a stationary motor current, whereby the predetermined time interval may lie between the time the motor is started and the time when the motor reaches the stationary motor current. The determined start-up time constant is used to compute a braking time constant by multiplying the start-up time constant with a motor voltage. The running gear is then slowed down by lowering the motor voltage as a function of time according to the braking time constant, whereby the gradient of the motor voltage as a function of time is always less than the gradient of the voltage decrease calculated from the braking time constant. Generating such a variable voltage for decelerating the running gear can be realized in a technically simple manner. In addition, the actual load is already reflected in the gradient of the motor current after starting the electric motor, and thus, there is no need for separate determination of the actual load.

The start-up time constant associated to the actual load may be determined more accurately by defining as the starting time of the predetermined time interval a point in time when the motor current reaches a first predetermined current threshold value after the motor has been switched on.

Suitably, the complexity of a control mechanism can be reduced by controlling the electric motor with identical voltage pulses, for example rectangular voltage pulses. The electric motor then operates as a rectifier, so that the average motor voltage is proportional to the duty cycle of the voltage pulses. The duty cycle of the pulses is maintained at a constant value during the start-up phase and the following stationary phase, where the running gear moves at a constant speed. The duty cycle then decreases continually during the deceleration or braking phase. The average value of the motor voltage (U) decreases proportional to the duty cycle, wherein at any given time t the average motor voltage (U) always decreases more slowly per unit time than the motor voltage computed from the braking time constant of the running gear.

According to another aspect of the invention, a running gear for a hoist or for lifting a suspended load has an electric motor that is coupled to a self-locking worm gear and a control unit. During a start-up phase of the motor, the control unit determines a start-up time constant from an average increase of the motor torque, and slows the running gear down by decreasing the motor torque. During the braking phase, the gradient of the motor torque as a function of time is always smaller than the corresponding gradient determined from the start-up time constant. The electric motor may be a permanent-magnet DC motor since the electric motor always operates as a drive motor and never as a generator. As a result, the motor does not have to supply a braking torque. To reduce costs, a collector motor may be employed.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
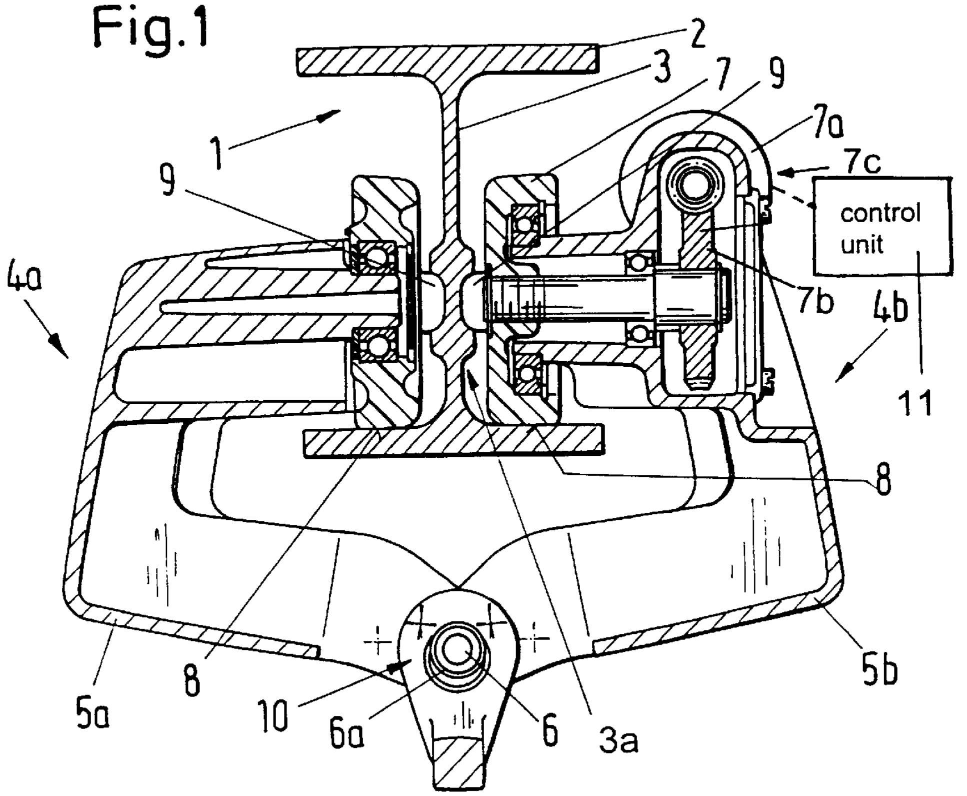
FIG. 1 is a front view of a running gear according to the present invention.
Figure 2:
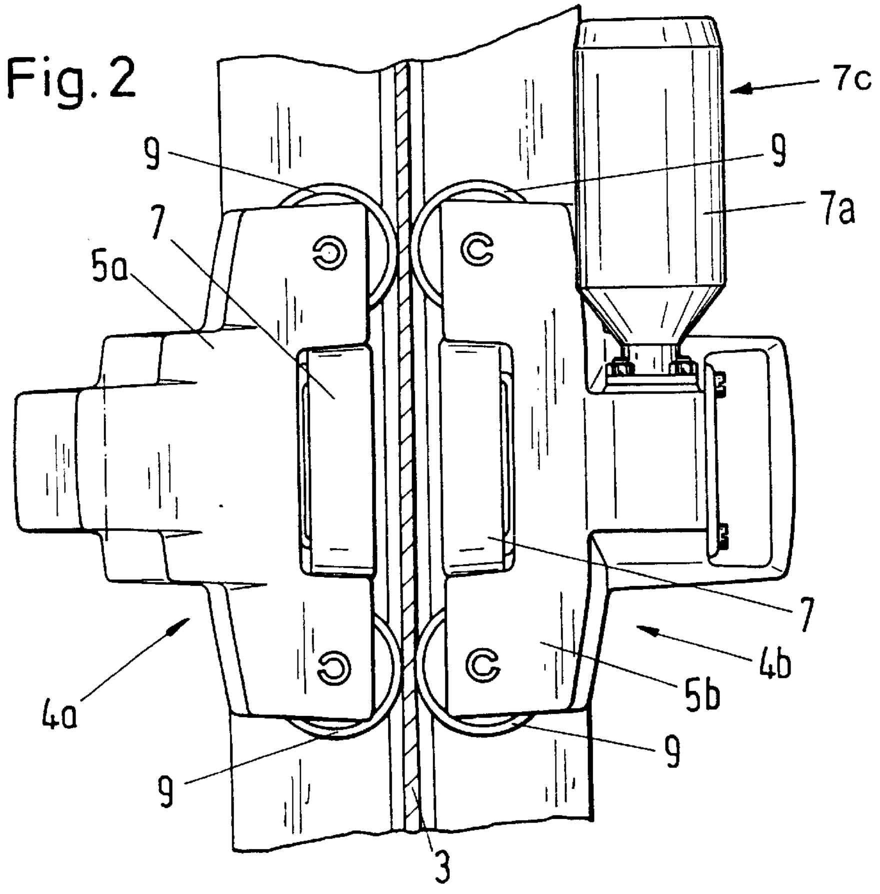
FIG. 2 is a top view of the running gear of FIG. 1.

Throughout all the Figures, same or corresponding elements are generally indicated by same reference numerals.

Turning now to the drawing, and in particular to FIG. 1, there is shown a front view of a running gear according to the present invention, including a running rail 1 which is formed of flange parts 2 and a web 3 with lateral guides 3*a*. The running rail 1 is substantially I-shaped in cross section and defines a substantially horizontal longitudinal direction of movement. The running gear includes two arm-like wheel carriers 4*a*, 4*b* that form frames 5*a*, 5*b*. The two wheel carriers 4*a*, 4*b* are hingedly connected by a joint 10 for rotation about a pivot axis 6 situated below of the running rail 1 and extending in the direction of the running rail 1, thereby allowing the wheel carriers 4*a*, 4*b* to pivot towards the running rail 1. Alternatively, the two wheel carriers 4*a*, 4*b* can also be rigidly connected to each other. Persons skilled in the art will understand that it is certainly conceivable to combine these variations, whereby the two wheel carriers 4*a*, 4*b* can be fixed in place after pivoting towards the running rail 1.

Mounted in the upper region of the wheel carriers 4*a*, 4*b* is a pair of opposing running wheels 7 having horizontal rotation axes and supported by the wheel carriers 4*a*, 4*b*. One of the two running wheels 7 is driven by an electric motor 7*a* which operates only in a motor drive mode, with a worm gear 7*b* being connected between the electric motor 7*a* and the driven running wheel 7. The running wheels 7 roll along running tracks 8 of the lower flange 2. The wheel carriers 4*a*, 4*b* also rotatably support horizontal guide rollers 9 which are arranged in pairs in front and behind the running wheels 7 and bear with both sides of the web 3 of the running rail 1.

As shown in FIG. 1, the wheel carriers 4*a*, 4*b* are so pivoted inwardly over the lower flange part 2 of the running rail 1 that the running wheels 7 move to a location immediately proximate to the web 3. The joint 10 located below the running rail 1 forms the load-engaging member for a load which, when suspended from the joint 10, acts on the pivot axis 6 at the height of the joint 10 between the wheel carriers 4*a*, 4*b*.

The suspended load produces a substantially downward (as viewed in FIG. 1) force at joint 10 and generates in the wheel carriers 4*a*, 4*b* a closing moment which causes the frame carriers 5*a*, 5*b* to swing inwardly towards the closed position, and forces the guide rollers 9 against the web 3 of the running rail. The angular position between the wheel carriers 4*a*, 4*b* in the closed position is defined in FIG. 1 by the guide rollers 9 that contact both sides of the web 3, with the guide rollers 9 being biased against the web 3 by a contact force that is generated by the suspended load.

The electric motor 7*a* operates exclusively as a drive motor and can therefore be implemented as a permanently excited DC motor 7*c*, preferably an inexpensive collector motor. The electric motor 7*a* is connected to the self-locking worm gear 7*b* and consequently operates with a base load, supplying a continuous motor torque M during operation. The combination of the DC motor 7*a* and the self-locking worm gear 7*b* consequently corresponds to a drive "with engaged brake.".

FIG. 1 also shows schematically the provision of a control unit 11 that controls the desired time dependence of the motor voltage U.

Figure 3:
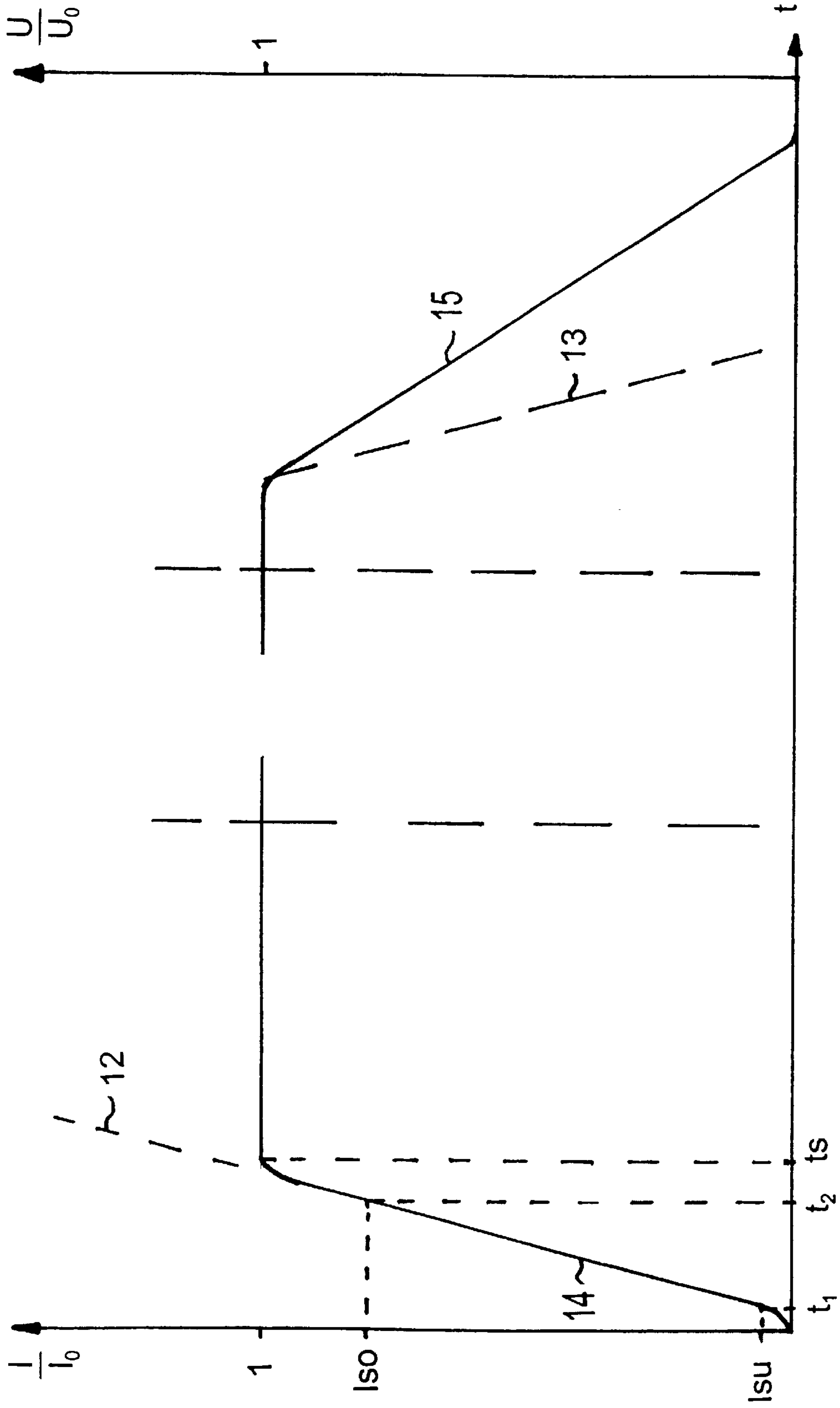
FIG. 3 illustrates schematically the time dependence of the motor current I during the start-up phase and the motor voltage U during the braking phase.

Referring now to FIG. 3, according to a first embodiment of the invention, after a switch is engaged to start the running gear, a motor voltage UO is applied to the electric motor 7*a* in the form of a voltage step. Alternatively, a time-dependent motor voltage may also be applied that increases gradually to a stationary value UO. The motor voltage UO produces a time-dependent motor current I which is proportional to the motor torque M, as illustrated schematically on the left hand side of FIG. 3 by the solid line 14. As also seen in FIG. 3, the motor current I increases slowly at the beginning and then increases approximately linearly with time, before reaching a stationary value 10 at the time $t_s$. The rise of the motor current I and the stationary portion of the motor current 10 depend on the motor load. The straight line 12 shown in FIG. 3 illustrates the linear increase in the current and corresponds to the average change in the normalized motor current 1/10 per unit time.

The control unit 11 can set a predetermined lower current threshold value ISU and an upper current threshold value ISO, and is able to control the actual motor current 1. The control unit 11 measures the time t1, when the motor current I reaches the lower threshold value ISU during the start-up phase, and the time t2, when the motor current I reaches the upper current threshold value ISO. The control unit 11 then divides the change in the current (ISO−ISU) by the time difference (t2−t1) to determine the rate of the current increase, R=(ISO−ISU)/(t2−t1), and then divides the rate R by the stationary current value IO to define a normalized start-up rate Rs of the load-bearing running gear. As seen from FIG. 3, the normalized start-up rate Rs corresponds to the gradient of the line 12. The control unit 11 then determines from the normalized start-up rate Rs a corresponding voltage braking rate Rb by multiplying the normalized start-up rate Rs with a stationary motor operating voltage UO. The normalized braking rate which is defined as the ratio between the actually applied voltage during the braking phase and the stationary motor operating voltage UO, is equal to the normalized start-up rate and is indicated on the right hand side of FIG. 3 by the straight line 13. The voltage_braking rate Rb is a measure for the maximum allowed change in the motor voltage U that does not introduce rolling and pitching of the running gear. The voltage braking rate Rb is smaller than or at most equal to the normalized start-up rate Rs multiplied with the stationary motor operating voltage UO. The voltage during the braking phase of the motor is then calculated by decreasing the operating voltage UO at a rate that is less than the voltage braking rate Rb, i.e., the applied voltage U during the motor braking phase is always ≧Rb.

In other words, during the braking or deceleration phase of the running gear, the control unit 11 lowers the motor voltage U as a function of time in such a way that the motor voltage at any given point in time t is always greater than the voltage determined from the voltage braking rate Rb of the running gear. The actual applied normalized motor voltage U/UO during the braking phase may be represented by the solid line 15 of FIG. 3, which is always above the dashed line 13. The motor voltage may be changed, for example, with a time constant that is twice as large as the braking time constant. In this way, the self-locking feature is added at a rate that is low enough to prevent a locking of the running wheels 7.

The motor speed can be controlled by lowering the motor voltage U because the motor current I which is proportional to the motor torque M follows the motor voltage U.

According to a second embodiment of the invention, the electric motor 7*a* is operated with identical voltage pulses having a variable temporal spacing or duty cycle. In this case, the control unit 11 adjusts the temporal spacing between the voltage pulses, i.e. the pulse duty cycle. The electric DC motor 7*a* averages the rectangular pulses to form a DC voltage with an averaged voltage level that corresponds to the pulse duty cycle. During the start-up phase and during the stationary phase, the duty cycle is maintained at a constant value. During the deceleration or braking phase, the temporal spacing between the voltage pulse is steadily increased, which is equivalent to a steady decrease of the duty cycle in such a way that the averaged voltage level of the motor voltage U at any given time t is always greater a voltage level computed from the braking time constant of the running gear.

With this very simple voltage control of the electric motor 7*a*, the running gear operates similar to a ballistic system, i.e., an energy storage reservoir, and responds to the voltage pulses in the same way as to a stationary motor voltage U with the same average value. The pulse control circuit, however, is much simpler to implement, because only the temporal spacing between pulses or the pulse duty cycle need to be adjusted to slow down the electric motor 7*a*.

While the invention has been illustrated and described as embodied in a running gear, in particular for hoists and suspended loads, and method of braking a running gear, it is not intended to be limited to the details shown since various modifications and structural changes may be made without departing in any way from the spirit of the present invention.

What is claimed as new and desired to be protected by letters patent is set forth in the appended claims:

What is claimed is:

1. A method for braking a running gear adapted for hoists and driven by an electric motor through a self-locking worm gear, with the motor having a motor operating voltage, said method comprising the steps of:

determining a start-up rate during a start-up phase of the electric motor from an increase of a motor torque as a function of time; and decreasing the motor torque as a function of time during a braking phase of the electric motor at a slower rate than the start-up rate to brake the running gear;

forming a voltage braking rate from a normalized start-up rate by multiplying the normalized start-up rate by a stationary motor operating voltage; and decreasing the motor operating voltage as a function of time during the braking phase of the electric motor at a slower rate than the voltage braking rate.

2. The method of claim 1, wherein the stationary motor operating voltage is applied to the motor during the start-up phase.

3. The method of claim 1, wherein said determining step includes determining a change of a motor drive current within a predetermined time interval defined by an initial time and a time when the motor reaches a stationary motor drive current; and dividing the change of the motor drive current by the stationary motor drive current to form the normalized start-up rate.

4. The method of claim 3 wherein the initial time is the time when the motor is switched on.

5. The method of claim 3 wherein the initial time is the time when the motor drive current reaches a first predetermined threshold value.

6. A method for braking a running gear adapted for hoists and driven by an electric motor through a self-locking worm gear, said method comprising the steps of:

determining a normalized start-up rate during a start-up phase of the electric motor from an increase in a motor drive current within a predetermined time interval defined by an initial time and a time when the motor reaches a stationary motor current, and dividing the change of the motor drive current by a stationary motor current; and multiplying the normalized start-up rate with a stationary motor operating voltage of the motor to form a voltage braking rate; and decreasing an actual motor voltage as a function of time during a braking phase of the electric motor at a slower rate than the voltage braking rate to brake the running gear.

7. The method of claim 6 wherein the initial time is the time when the motor is switched on.

8. The method of claim 6 wherein the initial time is the time when the motor current reaches a first predetermined current threshold value.

9. The method of claim 6 wherein the actual motor voltage includes identical voltage pulses having a temporal spacing and producing an average voltage, and wherein the temporal spacing is maintained at a constant value during the start-up phase and the time when the motor reaches the stationary motor current, and continually increases during a braking phase of the motor, so that the average value of the actual motor voltage always changes at a slower rate than the voltage braking rate of the running gear.

10. A running gear for a hoist, comprising:

a frame;

a running rail having two spaced-apart running tracks;

a plurality of axially spaced-apart running wheels rotatably supported in the frame and rolling on the running tracks of the running rail;

an electric motor coupled to a self-locking worm gear for directly driving one of the running wheels; and a control unit operatively connected to the electric motor, wherein said control unit:

determines a normalized start-up rate during a start-up phase from a change of a motor drive current as a function of time within a predetermined time interval defined by an initial time and a time when the motor reaches a stationary motor current, and dividing the change of the motor drive current by a stationary motor current;

multiplies the normalized start-up rate with a stationary motor operating voltage of the motor to form a voltage braking voltage; and decreases an actual motor voltage as a function of time during a braking phase of the electric motor at a slower rate than the voltage braking rate to brake the running gear.

* * * * *